United States Patent
Jessen et al.

(10) Patent No.: US 6,953,002 B2
(45) Date of Patent: Oct. 11, 2005

(54) BOAT WAKE SYSTEM

(76) Inventors: Robert H. Jessen, 3649 San Jose Ave., #6, Merced, CA (US) 95348; Michael Murphy, 33124 Case St., Lake Elsinore, CA (US) 92530

( * ) Notice: Subject to any disclaimer, the term of this patent is extended or adjusted under 35 U.S.C. 154(b) by 105 days.

(21) Appl. No.: 10/392,129

(22) Filed: Mar. 18, 2003

(65) Prior Publication Data

US 2003/0183149 A1     Oct. 2, 2003

Related U.S. Application Data

(60) Provisional application No. 60/367,294, filed on Mar. 26, 2002.

(51) Int. Cl.$^7$ .............................................. B63B 43/06
(52) U.S. Cl. ..................................... 114/125; 114/121
(58) Field of Search ................................ 114/121, 125

(56) References Cited

U.S. PATENT DOCUMENTS

| | | |
|---|---|---|
| 3,085,535 A | 4/1963 | Hunt |
| 3,186,371 A | 6/1965 | Moore |
| 3,259,100 A | 7/1966 | Kiekhaefer |
| 3,503,358 A | 3/1970 | Moesly |
| 3,559,222 A | 2/1971 | Walker |
| 3,736,608 A | 6/1973 | Whitehead |
| 4,217,845 A | 8/1980 | Hood et al. |
| 4,528,927 A | 7/1985 | Iizuka et al. |
| 4,538,538 A | 9/1985 | Carbonel |
| 5,645,003 A | 7/1997 | Grinde |
| 5,787,835 A | 8/1998 | Remnant |
| 5,979,350 A | 11/1999 | Larson et al. |
| 6,105,527 A | 8/2000 | Lochtefeld et al. |
| 6,234,099 B1 | 5/2001 | Jessen et al. |
| 6,427,616 B1 * | 8/2002 | Hagen ......................... 114/125 |
| 6,505,572 B1 * | 1/2003 | Seipel et al. ................. 114/125 |

* cited by examiner

Primary Examiner—Andrew D. Wright
(74) Attorney, Agent, or Firm—Joseph E. Mueth, Esq.

(57) ABSTRACT

A water craft having a bow and a stern including an engine of sufficient thrust to create an enlarged wake at the stern of the boat as the boat moves along the surface of a body of water.

The water tight compartment is positioned to carry water below the water line and essentially astride the centerline or keel of the boat. The compartment is adapted to contain liquid water in an amount sufficient to enhance or equalize the size of the boat wake.

The compartment extends from a point forward of the transom and engine, and extends to a point forward of the midpoint between the bow and the stern, and terminates short of the bow while serving to exert downward force on the bow against the water when the water craft is underway and the compartment carries water.

6 Claims, 2 Drawing Sheets

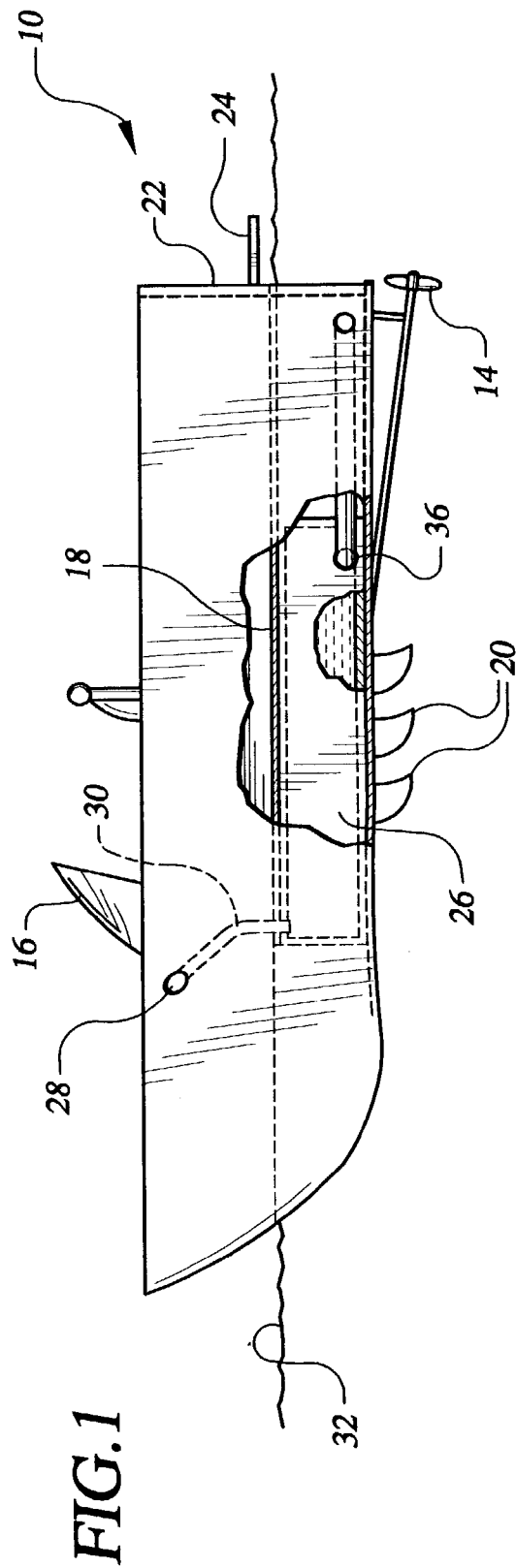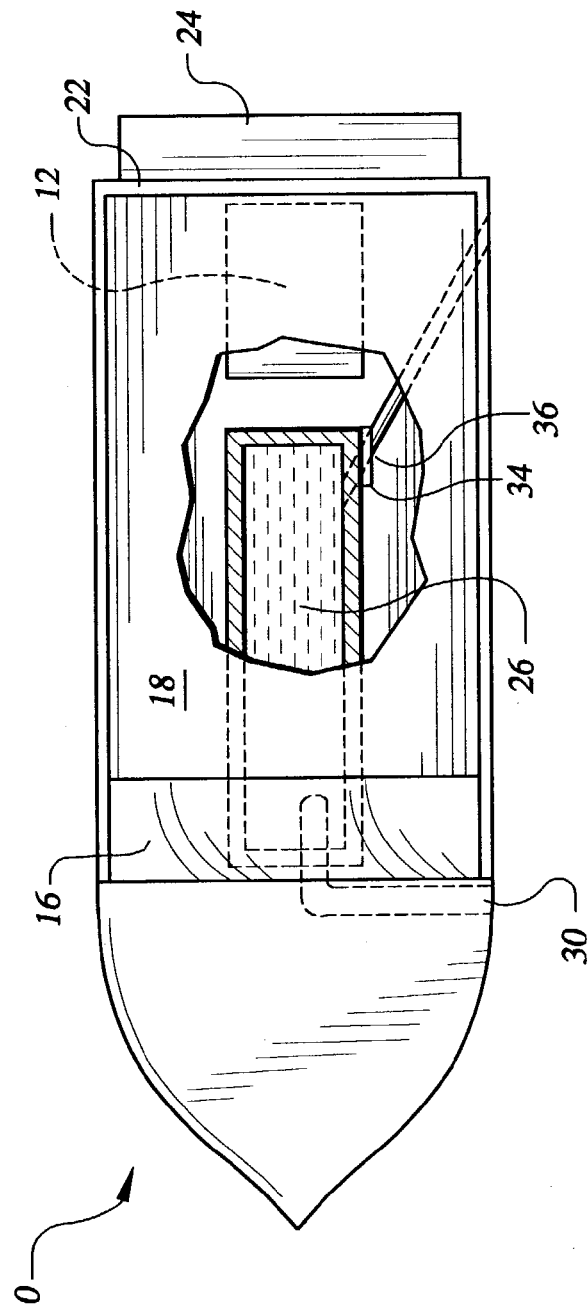

BOAT WAKE SYSTEM

This application claims the benefit of Provisional Patent Application Ser. No. 60/367,294, filed Mar. 26, 2002.

BACKGROUND OF INVENTION

Various devices have been proposed for modifying boats to enhance the wake of the boat. An enhanced wake increases the thrill and challenge of water skiing or water boarding behind a boat. The greater the wake, the more opportunity for stunts, thrills and competition. The wake of a power boat can be increased by the addition of weight in the stern. One way of lowering the stern of a boat in the water to increase the wake has been the use of weights such as concrete blocks. However, the use of weights in cumbersome and difficult to install and remove, and if a mishap occurs in the handling of weights, the boat may be severely damaged.

U.S. Pat. No. 5,787,835 to Remnant describes a lightweight, portable container located generally above the water line in the stern of a boat in order to add weight to the stern and enhance the wake of the boat. The container is formed from an outer bag and an inner, liquid impermeable bladder positioned within the bag and an inner, liquid impermeable bladder positioned within the bag and protected form puncture and abrasion by the bag. The container is carried on a flat surface near the stern of the boat and is held in place by straps. The bladder is filled with water, normally by a garden hose or an electric pump, through one or more nozzles accessed through openings in the bag. A hose is also used to drain the bag either over the side or through the bilge of the boat after the bag has been suitably repositioned or rotated.

Larson et al U.S. Pat. No. 5,979,350 discloses a boat having two ballast tanks positioned at the sides of the stern of the boat and extending toward the center of the stern, the ballast tanks projecting substantially above the water line.

Hunt U.S. Pat. No. 3,085,535 describes a watercraft having a tunnel which runs essentially the length of the hull and fills with water through the transom at its open rear end when the hull is at rest or moving at low speed. A vent is provided at the closed forward end of the tunnel. The ballast afforded by the water is said to provide increased stability, particularly in reducing the tendency of certain V-shaped hulls to yaw in following seas. As the watercraft accelerates, the water flows out of the rear of the tunnel.

Moesly U.S. Pat. No. 3,503,358 discloses another V-shaped hull watercraft, with outboard motor, having two compartments for containing ballast water, forward compartment A, and centrally located compartment B (which can extend rearwardly to the transom). Compartments A & B are each vented. A valve assembly is opened to fill compartments A & B via a scoop which is lowered when the boat is moving forward. Moesly relies on the scoop to fill the compartments A & B. This can occur only when the water craft is in motion.

Jessen et al U.S. Pat. No. 6,234,099 B1 discloses a water craft including an engine of sufficient thrust to create an enlarged wake at the stern of the boat as the boat moves along the surface of a body of water, and two water tight compartments positioned below the waterline having a sealable opening at the stern of the boat below the water line. The water tight compartments extend from the stern to a point forward of the engine. The compartment is adapted to contain liquid water in an amount sufficient to enhance or equalize the size of the boat wake. The opening is adapted to be opened to drain out the water.

SUMMARY OF THE INVENTION

Briefly, this invention comprises a water craft having a bow and a stern including an engine of sufficient thrust to create an enlarged wake at the stern of the boat as the boat moves along the surface of a body of water, and a water tight compartment positioned to carry water below the water line and essentially astride the centerline or keel of the boat, said compartment being adapted to contain liquid water in an amount sufficient to lower the entire boat in the water and enhance or equalize the size of the boat wake, and said compartment extending from a point forward of the transom and engine, extending to a point forward of the midpoint between the bow and the stern, and terminating short of the bow while serving to exert downward force on the bow against the water when the water craft is underway and the compartment carries water.

In the case of an inboard engine, the water compartment stops forward of the front of the engine compartment as shown in the drawings (which is usually about 6 or 8 feet forward of the transom). In the case of rear mounted outboard, the rearward extent of the water compartment stops at about the same point, leaving substantial distance between the rear end of the water compartment and the transom.

The present invention is unique in that all of the ballast water is normally carried below the water line and the water tight compartment extends from a point forward of the engine to a point beyond the midpoint between the bow and the stern. This lowers the entire boat in the water and does not raise the bow or front of the boat when underway which wastes power, makes the boat more difficult to handle, and restricts visibility. Thus, the boat of the present invention provides an enlarged wake in a more efficient manner, the boat is easier to turn and maneuver, and is capable of higher speeds.

This ballast system of this invention is to be placed in the bottom of a boat, below the floorboards in front of the engine of a v-drive, stern drive, outboard, twin engine or jet type boat.

The purpose of this invention is to enlarge the wake size on a 16–32 foot boat by pushing the bow of the boat down further against the water and in return creating a larger wake behind the boat. The enlarged wake enhances the amount of lift water sports enthusiasts gain from wake-jumps and water-ski maneuvers. The added weight of the ballast tank in front of the engine keeps the nose down, assists in planing, increase the drivers visibility and make it easier to maintain a steady speed. The location of the ballast tank gives the boat more pulling power off the start by keeping the nose down, decreasing the angle of attack, and utilizing the power of the engine to pull the skier/skiers as opposed to displacing the water or pushing water away because the nose is overexposed.

Presently, most ballast systems are located above the floorboard on this type of boat. The exceptions being the above-mentioned U.S. Pat. No. 6,234,099 B1 which utilizes a two tank ballast system under the floorboard, outside the stringers, U.S. Pat. No. 3,085,535 utilizes a tunnel running the length of the hull to stabilize certain types of hulls and not to enlarge the wake, and U.S. Pat. No. 3,503,358 relies on a mechanical scoop to fill the two compartments which projects at the front significantly above the waterline. The water pick up scoop is also complicated and expensive, and this arrangement is dependent on dynamic water pressure caused by the forward movement of the boat.

The ballast system of the present invention is a singular tank located in the center of the boat astride the midline as opposed to two tanks on the outside of each stringer or aligned two tanks. The ballast system of this invention is a watertight compartment laminated/molded into the existing hull and floor molds or it can be an independent tank made of, but not limited to, a metal, plastic, or composite type material.

The ballast tank can be filled and emptied by an ordinary fluid pump which can either be carried onboard the boat for greater flexibility in adding and removing water from the watertight compartment or can be located dockside.

This ballast tank system is provided with an air vent system to relieve the ballast tank of air when filling with water. It is located at the physically highest and most forward point of the sealed compartment area connected by a length of preferably rubber or suitable flexible hose to vent through the boat hull well above the water line.

The ballast tank optionally has an exit/entrance gate attached to it. The tank is filled by flooding of this gate. The gate allows the operator to control the desired amount of water/weight to enhance the wake size. The tank is filled to the level desired by static pressure and is not dependent on the boat being underway. The gate entrance to the ballast tank is preceded by a tube that carries the water to and from the ballast tank. The tube travels from the gate of the tank to the rear of the boat starboard or port or on the bottom of the hull. The gate entry point for this system is located below the waterline of the boat and fills when the boat is stationary. The water level in the ballast tank will equal the water level line on the outside of the hull if the gate is left open. If less ballast is desired, the gate can be closed sooner. The water drains by centrifugal force when the boat is in a forward motion on a plane. Additional gate assemblies can be used to increase the speed of flooding and draining of the tank.

THE DRAWINGS

Turning to the drawings:

FIG. 1 is a side view, in partial breakaway, showing a boat equipped with the wake enlarging and equalizing apparatus of this invention, with the boat having inboard engine.

FIG. 2 is a top view in partial breakaway taken from FIG. 1.

DESCRIPTION OF THE PREFERRED EMBODIMENT

Figure 3:
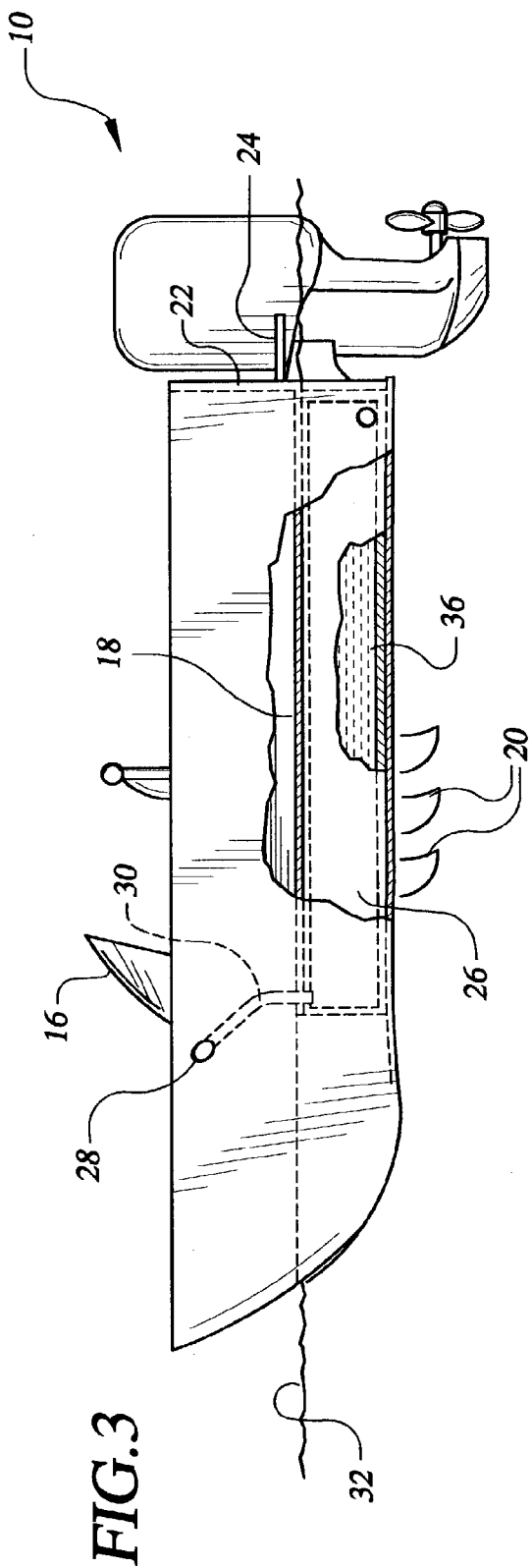
FIG. 3 is a side view in partial breakaway showing the invention as provided on boat having an outboard engine.
Figure 4:
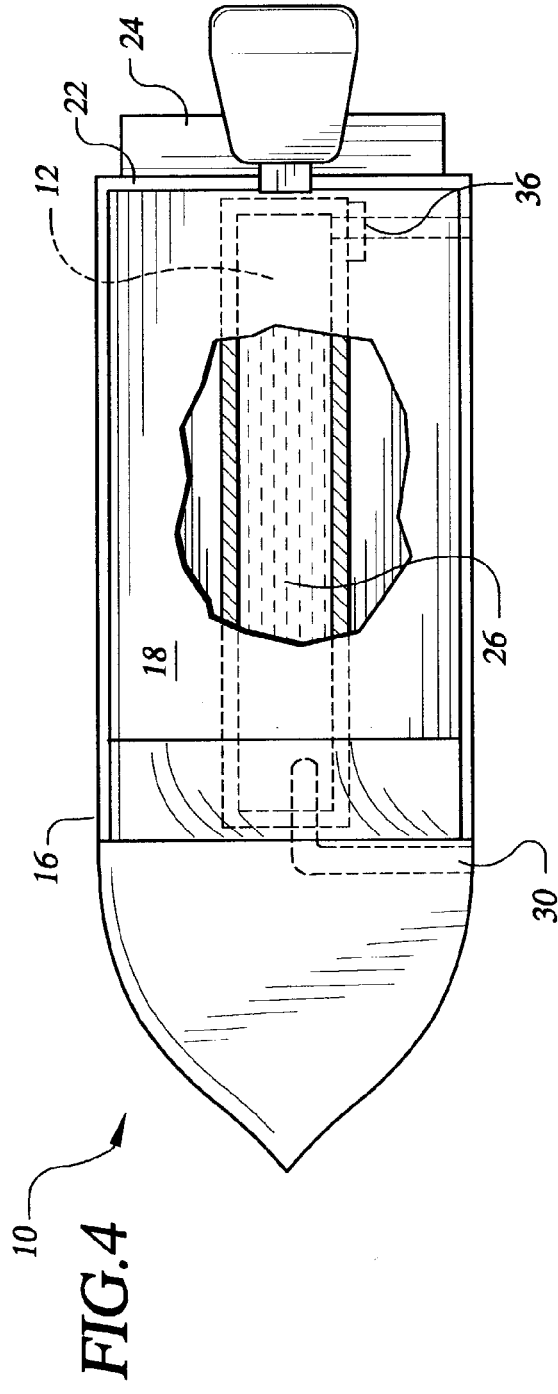
FIG. 4 is a top view in partial breakaway taken from FIG. 3.

The subject of this patent application is more generally described with reference to the preferred embodiment as follows:

Turning to the drawings in more detail.

The subject of this patent application is an apparatus and method to enlarge and/or equalize the size of the boat wake, typically in 16' to 32' power boats, used for towable water sports, such as water skiing and water boarding. The hull 10 of the power boat is provided with a conventional engine with cover 12, screw 14, windshield 16, floorboard 18, rudder 20, and transom 22 provided with swim step 24. The means for storage of water, under the floorboard 18 of the boat, is composed of a water tight compartment 26 astride the centerline, formed and sealed by integral formation within the boat construction itself. Alternatively, a waterproof liner or bladder can be used which is held snugly in place by partitions and/or bulkheads. Any combination of both boat construction and waterproof liner can also be used. The water tight compartment can be made of Fiberglass, rubber, plastic, chemically lined, metal or some combination, and, in shape, conforming to area at the midline below the waterline extending from just aft of the bow to a point forward of the engine.

A means for the venting of air is provided in communication with the compartment 26. Normally, the simplest means for equalizing the air is a vent, 28, located at the physically highest and most forward part of the compartment 26, for storage of water. The vent 28, communicates via hose means 30, for providing air to the means for passing air through the boat hull, at a point well above the water line. Normally an air vent hose barb is present on the water compartment and is made of metal or plastic. The air vent hose itself is usually made of rubber, plastic or metal. The external air vent passing through the boat hull is metal or plastic and is round or hollow in shape.

The optional and alternative means for controlling the amount of water flowing to or from the water compartment 26, allows large amounts of water to enter or exit the water compartment, passing through the rear transom 22 of the boat, below the waterline 32, for the purpose of flooding or filling, as well as draining or emptying the compartment 26 of water. The boat occupants can remotely control the amount of water flowing into or out of the compartments 26, via control 34. In compartment 26 water flow is controlled by sealable large opening device 36, made of fiberglass, metal, plastic, hard rubber or combination, and is rectangular, oval, or any shape. A gate valve is preferred.

The means for connecting control 34 to gate valve 36 usually includes a metal flange-like connection attached to the gate valve 36. When installed, one person in the boat can easily, at any time, remotely open or close the large underwater openings located through the rear transom 22 of the boat just below the water line 32, causing water to quickly flood into the compartment 26, at a rate of flow controlled by the operator. The control 34 inside boat attached to the gate valve 36 is operated by either electrical, mechanical, manual, or hydraulic means and employs switch lever, valve, cable control, or combination.

This method allows the operator to individually adjust the final weight in the compartment, providing a quick and easy means of fine adjustment to the resulting overall height, size, and shape of the boat wake. For quickly emptying the water compartment, an individual in the boat, at any time can open the sealable water opening, allowing the water to quickly flow out of the compartment while the boat is in forward motion on plane. The sealable water opening may then be closed, returning the boat to normal operation without the extra water weight and the accompanying enlarged boat wake, resuming the boat's normal wake characteristics.

Alternatively, a water pump can be used to fill and empty the water compartment 26 in which case elements 34 and 36 are not present. The vent 28 and hose 30 can be retained to allow air to escape when filling and air to enter when emptying the water compartment.

The empty compartment contains air which causes increased buoyance not normally present.

Having fully described the invention, the following claims are intended to particularly point out and distinctly claim the invention.

What is claimed is:

1. A water craft comprising:
   a hull having a bow and a stern an engine of sufficient thrust to create an enlarged wake at the stern of the boat as the boat moves along the surface of a body of water, a water tight compartment essentially filled with ballast water and positioned to carry essentially all of the ballast water below the running water line of the boat, said water tight compartment being essentially astride the centerline or keel of the boat, said water tight compartment containing ballast water in an amount sufficient to lower the entire boat in the water at steady planing speed and enhance or equalize the size of the boat wake, and said water tight compartment extending from a point forward of the transom of the boat and engine, extending to a point forward of the midpoint between the bow and the stern, and terminating short of the bow, said ballast water in said essentially filled water tight compartment serving the exert downward force on the bow against the water when the water craft is underway at steady planing speed to create a larger wake and an enhanced amount of lift water for an enthusiast being towed behind the water craft on a towable water sports device.

2. The water craft of claim 1 wherein the water craft is a 16' to 32' boat used primarily for towable water sports.

3. The water craft of claim 1 wherein said watertight compartment comprises an interior portion of the water craft construction.

4. The water craft of claim 1 wherein the watertight compartment comprises a bladder.

5. The water craft of claim 1 including an air vent system for said compartment located at the physically highest and most forward part of said compartment.

6. The water craft of claim 5 wherein said system further includes a length of rubber or suitable flexible hose connected to a vent through the boat hull above the water line.

* * * * *